(12) United States Patent
Li et al.

(10) Patent No.: US 11,894,766 B2
(45) Date of Patent: Feb. 6, 2024

(54) THREE-PHASE INTERLEAVED RESONANT CONVERTER AND POWER CIRCUIT

(71) Applicant: Lite-On Electronics (Guangzhou) Limited, Guangzhou (CN)

(72) Inventors: Yan Li, Guangzhou (CN); Lu Sun, Guangzhou (CN); PeiXian Lv, Guangzhou (CN); XiaoQiang Li, Guangzhou (CN)

(73) Assignee: Lite-On Electronics (Guangzhou) Limited, Guangzhou (CN)

( * ) Notice: Subject to any disclaimer, the term of this patent is extended or adjusted under 35 U.S.C. 154(b) by 31 days.

(21) Appl. No.: 17/528,206

(22) Filed: Nov. 17, 2021

(65) Prior Publication Data

US 2023/0009358 A1 Jan. 12, 2023

(30) Foreign Application Priority Data

Jul. 6, 2021 (CN) .......................... 202110762623.2

(51) Int. Cl.
*H02M 3/00* (2006.01)
*H02M 3/335* (2006.01)
*H02M 1/00* (2006.01)

(52) U.S. Cl.
CPC ........... *H02M 3/01* (2021.05); *H02M 1/0058* (2021.05); *H02M 3/33569* (2013.01)

(58) Field of Classification Search
CPC .. H02M 3/01; H02M 1/0058; H02M 3/33569; H02M 1/0043; H02M 3/33573; H02M 3/33584; H02M 3/33592; Y02B 70/10
See application file for complete search history.

(56) References Cited

U.S. PATENT DOCUMENTS

| | | | | |
|---|---|---|---|---|
| 9,240,723 B2* | 1/2016 | Boysen | ................... | H02M 3/24 |
| 10,790,081 B2* | 9/2020 | Fei | ....................... | H01F 27/2804 |
| 11,088,625 B1* | 8/2021 | Cao | .................... | H02M 3/33584 |
| 11,196,349 B2* | 12/2021 | Bouchez | ........... | H02M 3/33592 |
| 11,404,966 B2* | 8/2022 | Kim | ................... | H02M 3/33584 |
| 11,404,967 B2* | 8/2022 | Fei | ........................... | H01F 38/08 |
| 2012/0320638 A1* | 12/2012 | Boysen | ................... | H02M 3/24 |
| | | | | 363/21.02 |

(Continued)

*Primary Examiner* — Yusef A Ahmed

(57) ABSTRACT

Disclosed is a three-phase interleaved resonant converter, which includes a three-phase inversion circuit connected to an input voltage and including a first output node, a second output node, and a third output node, a three-phase transformer including three transformers, a three-phase resonant circuit including three resonant capacitors and three resonant inductors, and a three-phase rectifier filter circuit. One ends of the three resonant inductors are respectively connected to the first output node, the second output node and the third output node, and the other ends of the three resonant inductors are respectively connected to a triangular configuration formed by an alternate connection of the three resonant capacitors with primary windings of the three transformers. The three-phase rectifier filter circuit is connected with secondary windings of the three transformers to rectify and filter secondary currents output by the secondary windings of the three transformers respectively, and generate an output voltage accordingly.

14 Claims, 6 Drawing Sheets

(56) References Cited

U.S. PATENT DOCUMENTS

| | | | |
|---|---|---|---|
| 2013/0003424 A1* | 1/2013 | Song | H02M 3/33584 363/21.04 |
| 2013/0201725 A1* | 8/2013 | Boysen | H02M 3/24 336/10 |
| 2015/0180350 A1* | 6/2015 | Huang | H02M 3/33584 307/66 |
| 2016/0254756 A1* | 9/2016 | Yang | H01F 27/2823 363/21.02 |
| 2018/0152112 A1* | 5/2018 | Torrico-Bascopé | H02M 3/33584 |
| 2018/0198373 A1* | 7/2018 | Torrico-Bascopé | H02M 3/33592 |
| 2018/0269795 A1* | 9/2018 | Zhou | H02M 7/4826 |
| 2019/0355506 A1* | 11/2019 | Fei | H01F 27/2804 |
| 2019/0379291 A1* | 12/2019 | Xue | H02M 7/219 |
| 2019/0379292 A1* | 12/2019 | Fei | H01F 3/14 |
| 2020/0044571 A1* | 2/2020 | Bouchez | H02M 3/33584 |
| 2020/0044572 A1* | 2/2020 | Bouchez | H02M 3/33584 |
| 2020/0321878 A1* | 10/2020 | Zhang | H02M 7/483 |
| 2021/0067048 A1* | 3/2021 | Zhang | H02M 3/01 |
| 2021/0070185 A1* | 3/2021 | Liu | B60L 53/51 |
| 2021/0099097 A1* | 4/2021 | Zhang | H02M 3/01 |
| 2021/0126550 A1* | 4/2021 | Yenduri | H02M 7/217 |
| 2021/0408927 A1* | 12/2021 | Zhang | H02M 3/01 |
| 2022/0014099 A1* | 1/2022 | Kim | H02M 1/0025 |
| 2022/0158562 A1* | 5/2022 | Yang | H02M 3/1586 |
| 2022/0337166 A1* | 10/2022 | Chan | H02M 1/4233 |
| 2022/0416677 A1* | 12/2022 | Yang | H02M 3/33573 |

* cited by examiner

US 11,894,766 B2

THREE-PHASE INTERLEAVED RESONANT CONVERTER AND POWER CIRCUIT

CROSS REFERENCE TO RELATED APPLICATION

This application claims the priority benefit of Chinese Patent Application Serial Number 202110762623.2, filed on Jul. 6, 2021, the full disclosure of which is incorporated herein by reference.

BACKGROUND

Technical Field

The present disclosure relates to the technical field of resonant converter, and more particularly to a three-phase interleaved resonant converter and a power circuit.

Related Art

The single-phase LLC resonant converter implements the primary-side zero voltage switching (ZVS) and the secondary-side zero voltage switching/zero current switching (ZCS), and optimizes the current sharing problem between the parallel winding and the synchronous rectifier and termination loss, so that the single-phase LLC resonant converter is suitable for high-efficiency, high-power-density power circuits.

Since the single-phase LLC resonant converter has the problems of a large output current ripple and a large output filter capacitor, and the demand for power and power density increases, related industries have proposed a multi-phase interleaved resonant converter to reduce the output current ripple, reduce the volume and quantity of output filter capacitors, and improve heat distribution. However, in the actual multi-phase interleaved resonant converter, due to manufacturing process deviations, parameter differences of components such as resonant inductors and resonant capacitors, and parameter changes caused by environmental changes, there is the problem of unbalanced load current shared by the converter for each phase, thereby reducing the efficiency, reliability and life of the multiphase interleaved resonant converter. In addition, the multi-phase interleaved resonant converter also has the problem of a large number of components.

Therefore, how to provide a simplified multi-phase interleaved resonant converter to achieve current balance during operation is an urgent problem to be resolved by a person skilled in the art.

SUMMARY

The embodiments of the present disclosure provide a three-phase interleaved resonant converter and a power circuit, which can effectively solve the problem of the current imbalance of the resonant converter for each phase in the operation of the multi-phase interleaved resonant converter in the prior art.

In order to solve the above problems, the present disclosure is implemented as follows.

In a first aspect of the present disclosure, a three-phase interleaved resonant converter is provided. The three-phase interleaved resonant converter includes a three-phase inversion circuit, a three-phase transformer, a three-phase resonant circuit and a three-phase rectifier filter circuit. The three-phase inversion circuit is connected to an input voltage and includes a first output node, a second output node, and a third output node. The three-phase transformer includes three transformers. The three-phase resonant circuit includes three resonant capacitors and three resonant inductors. One ends of the three resonant inductors are respectively connected to the first output node, the second output node and the third output node, and the other ends of the three resonant inductors are respectively connected to a triangular configuration formed by an alternate connection of the three resonant capacitors with primary windings of the three transformers. The three-phase rectifier filter circuit is connected with secondary windings of the three transformers to rectify and filter secondary currents output by the secondary windings of the three transformers respectively, and generate an output voltage accordingly.

In a second aspect of the present disclosure, a power circuit is provided. The power circuit includes the three-phase interleaved resonant converter of the embodiments of the present disclosure.

In the embodiments of the present disclosure, through the circuit topology design in which the first output node, the second output node and the third output node are respectively connected in series with the three resonant inductors, and then connected to the triangular configuration formed by the alternate connection of the three resonant capacitors with the primary windings of the three transformers, the three-phase interleaved resonant converter has a small number of components and has the ability of natural current sharing during operation, and no additional current sharing control means is required. In addition, since the primary windings of the three transformers and the three resonant capacitors are alternately connected to form the triangle configuration, the volume (or capacitance) of each resonant capacitor can be reduced by two-thirds and the power density can be improved.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
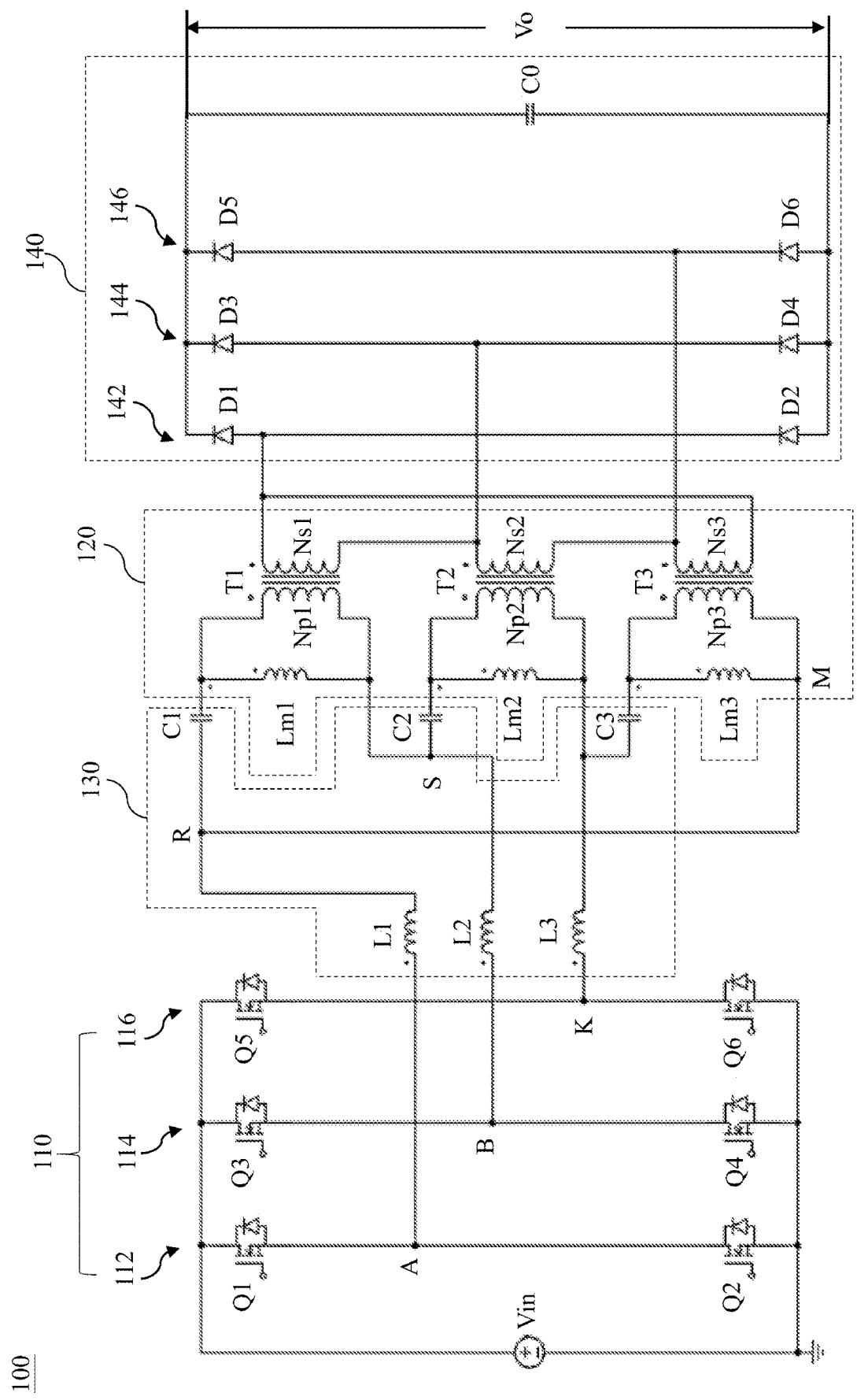
FIG. 1 is a circuit topology diagram of a three-phase interleaved resonant converter according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In addition, the terms 'first', 'second' and the like in the embodiments of the present disclosure are used for distinguishing similar objects instead of distinguishing a specific sequence or a precedence order.

In the following embodiments, the same reference numerals are used to refer to the same or similar elements throughout the disclosure.

Please refer to FIG. 1, which is a circuit topology diagram of a three-phase interleaved resonant converter according to an embodiment of the present disclosure. As shown in FIG. 1, in this embodiment, the three-phase interleaved resonant converter 100 comprises a three-phase inversion circuit 110, a three-phase transformer 120, a three-phase resonant circuit 130, and a three-phase rectifier filter circuit 140. The three-phase inversion circuit 110 is connected to the input voltage Vin and comprises a first output node A, a second output node B, and a third output node K. The three-phase transformer 120 comprises three transformers (i.e., the first transformer T1, the second transformer T2 and the third transformer T3). The three-phase resonant circuit 130 comprises three resonant capacitors (i.e., the first resonant capacitor C1, the second resonant capacitor C2, and the third resonant capacitor C3) and three resonant inductors (i.e., the first resonant inductor L1, the second resonant inductor L2 and the third resonant inductor L3).

One ends of the three resonant inductors (i.e., the first resonant inductor L1, the second resonant inductor L2 and the third resonant inductor L3) are respectively connected to a first output node A, a second output node B, a third output node K. The other ends of the three resonant inductors (i.e., the first resonant inductor L1, the second resonant inductor L2 and the third resonant inductor L3) are connected to the triangular configuration formed by an alternate connection of the three resonant capacitors (i.e., the first resonant capacitor C1, the second resonant capacitor C2, and the third resonant capacitor C3) and the primary windings of the three transformers (i.e., the primary windings Np1 of the first transformer T1, the primary windings Np2 of the second transformer T2, and the primary windings Np3 of the third transformer T3). The three-phase rectifier filter circuit 140 is connected with the secondary windings of the three transformers (i.e., the secondary windings Ns1 of the first transformer T1, the secondary windings Ns2 of the second transformer T2, and the secondary windings Ns3 of the third transformer T3) to rectify and filter the secondary currents output by the secondary windings of the three transformers (i.e., the secondary windings Ns1 of the first transformer T1, the secondary windings Ns2 of the second transformer T2, and the secondary windings Ns3 of the third transformer T3) respectively, and generate the output voltage Vo accordingly.

It should be noted that the first resonant capacitor C1, the second resonant capacitor C2, and the third resonant capacitor C3 are resonant capacitors with the same specification; the first resonant inductor L1, the second resonant inductor L2, and the third resonant inductor L3 are resonant inductors with the same specification; and the first transformer T1, the second transformer T2, and the third transformer T3 are transformers with the same specification.

In this embodiment, through the circuit topology design in which the first output node A, the second output node B and the third output node K are connected in series with the first resonant inductor L1, the second resonant inductor L2 and the third resonant inductor L3 respectively, and then connected to the triangular configuration formed by connecting the first resonant capacitor C1, the primary winding Np1 of the first transformer T1, the second resonant capacitor C2, the primary winding Np2 of the second transformer T2, the third resonant capacitor C3, and the primary winding Np3 of the third transformer T3 in sequence, the three-phase interleaved resonant converter 100 has a small number of components and has the ability of natural current sharing during operation, and no additional current sharing control means is required. In addition, the three-phase interleaved resonant converter 100 can also implement soft switching through the above-mentioned circuit topology.

In one embodiment, the three-phase inversion circuit 110 comprises a first switching bridge arm 112, a second switching bridge arm 114, and a third switching bridge arm 116 connected in parallel. The midpoint of the first switching bridge arm 112 is the first output node A, the midpoint of the second switching bridge arm 114 is the second output node B, and the midpoint of the third switching bridge arm 116 is the third output node K. The phase difference between the driving pulses of the first switching bridge arm 112 and the driving pulses of the second switching bridge arm 114 is 120 degrees, the phase difference between the driving pulses of the second switching bridge arm 114 and the driving pulses of the third switching bridge arm 116 is 120 degrees, and the phase difference between the driving pulses of the third switching bridge arm 116 and the driving pulses of the first switching bridge arm 112 is 120 degrees.

Through the interleaving operation with the phase shift of 120 degrees performed by the first switching bridge arm 112, the second switching bridge arm 114, and the third switching bridge arm 116, the input current ripple and the output current ripple of the three-phase interleaved resonant converter 100 are smaller, so that the three-phase interleaved resonant converter 100 is suitable for the application environment of the high power. The driving pulses of the first switching bridge arm 112, the second switching bridge arm 114, and the third switching bridge arm 116 are three-phase electrical signals with the same amplitude, the same frequency, and a phase difference of 120 degrees.

In one embodiment, the first switching bridge arm 112 comprises two first switches Q1 and Q2 connected in series with a switching timing difference of 180 degrees, the second switching bridge arm 114 comprises two second switches Q3 and Q4 connected in series with a switching timing difference of 180 degrees, and the third switching bridge arm 116 comprise two third switches Q5 and Q6 connected in series with a switching timing difference of 180 degrees. The midpoint of the first switching bridge arm 112 (i.e., the first output node A) is disposed between the first switch Q1 and the first switch Q2, and the midpoint of the second switching bridge arm 114 (i.e., the second output node B) is disposed between the second switch Q3 and the second switch Q4, and the midpoint of the third switching bridge arm 116 (i.e., the third output node K) is disposed between the third switch Q5 and the third switch Q6.

In an embodiment, the first switch Q1, the first switch Q2, the second switch Q3, the second switch Q4, the third switch Q5, and the third switch Q6 are insulated gate bipolar transistors (IGBTs), silicon carbide (SiC) transistors, metal oxide semiconductor field effect transistors (MOSFETs) or gallium nitride (GaN) transistors, respectively. It should be noted that the first switch Q1, the first switch Q2, the second switch Q3, the second switch Q4, the third switch Q5, and the third switch Q6 need to be switches with the same specification.

In one embodiment, the two ends of each of the first switch Q1, the first switch Q2, the second switch Q3, the second switch Q4, the third switch Q5, and the third switch Q6 are connected with a parallel reverse diode respectively.

In one embodiment, the first resonant capacitor C1, the primary winding Np1 of the first transformer T1, the second resonant capacitor C2, the primary winding Np2 of the second transformer T2, the third resonant capacitor C3, and the primary winding Np3 of the third transformer T3 are sequentially connected to form a triangular configuration. The two ends of the first resonant inductor L1 are respectively connected to the connection node R between the first resonant capacitor C1 and the primary winding Np3 of the third transformer T3 and the first output node A. The two ends of the second resonant inductor L2 are respectively connected to the connection node S between the second resonant capacitor C2 and the primary winding Np1 of the first transformer T1 and the second output node B. The two ends of the third resonant inductor L3 are respectively connected to the connection node M between the third resonant capacitor C3 and the primary winding Np2 of the second transformer T2 and the third output node K.

In one embodiment, the first excitation inductor Lm1 of the first transformer T1 is connected in parallel with the primary winding Np1, the second excitation inductor Lm2 of the second transformer T2 is connected in parallel with the primary winding Np2, and the third excitation inductor Lm3 of the third transformer T3 is connected in parallel with the primary winding Np3 (that is, in each of the three transformers, the excitation inductor is connected in parallel with the primary winding). The first excitation inductor Lm1, the second excitation inductor Lm2, and the third excitation inductor Lm3 can be respectively arranged inside the first transformer T1, the second transformer T2, and the third transformer T3, or can be respectively arranged outside the first transformer T1, the second transformer T2, and the third transformer T3. When the first excitation inductor Lm1, the second excitation inductor Lm2, and the third excitation inductor Lm3 can be arranged outside the first transformer T1, the second transformer T2, and the third transformer T3 respectively, the eddy loss of the first transformer T1, the second transformer T2 and the third transformer T3 can be reduced. In addition, the first resonant capacitor C1, the first resonant inductor L1 and the first excitation inductor Lm1 constitute an LLC resonant circuit, the second resonant capacitor C2, the second resonant inductor L2 and the second excitation inductor Lm2 constitute an LLC resonant circuit, and the third The resonant capacitor C3, the third resonant inductor L3, and the third excitation inductor Lm3 constitute an LLC resonant circuit, so that the three-phase interleaved resonant converter 100 is a three-phase interleaved LLC resonant converter.

It should be noted that the first excitation inductor Lm1, the second excitation inductor Lm2, and the third excitation inductor Lm3 are excitation inductors with the same specification.

In one embodiment, the three-phase rectifier filter circuit 140 comprises three rectifier bridge arms (i.e., the first rectifier bridge arm 142, the second rectifier bridge arm 144, and the third rectifier bridge arm 146) connected in parallel. The midpoints of the three rectifier bridge arms are connected to the triangular configuration formed by the secondary windings of the three transformers (i.e., the secondary windings Ns1 of the first transformer T1, the secondary windings Ns2 of the second transformer T2, and the secondary windings Ns3 of the third transformer T3) connected to each other, respectively.

In one embodiment, the first rectifier bridge arm 142 comprises a first diode D1 and a first diode D2 connected in series, the second rectifier bridge arm 144 comprises a second diode D3 and a second diode D3 connected in series, and third rectifier bridge arm 146 comprises a third diode D5 and a third diode D6 connected in series (that is, each of the three rectifier bridge arms comprises two diodes connected in series). The first diode D1, the second diode D3, and the third diode D5 may also be referred to as the upper diodes of the first rectifier bridge arm 142, the second rectifier bridge arm 144, and the third rectifier bridge arm 146, respectively. The first diode D2, the second diode D4, and the third diode D6 may also be referred to as the lower diodes of the first rectifier bridge arm 142, the second rectifier bridge arm 144, and the third rectifier bridge arm 146, respectively.

It should be noted that the first diode D1, the first diode D2, the second diode D3, the second diode D4, the third diode D5, and the third diode D6 are diodes with the same specification.

In one embodiment, the three-phase rectifier filter circuit 140 further comprises a filter capacitor C0, which is connected in parallel with three rectifier bridge arms (i.e., the first rectifier bridge arm 142, the second rectifier bridge arm 144, and the third rectifier bridge arm 146), and the filter capacitor C0 is configured to convert the secondary currents rectified by the first rectifier bridge arm 142, the second rectifier bridge arm 144, and the third rectifier bridge arm 146 to the output voltage Vo that provides energy to the output load circuit.

In the following, the three-phase interleaved resonant converter 100 has the ability of natural current sharing and can implement soft switching by way of an example in conjunction with FIGS. 1 to 13.

Figure 2:
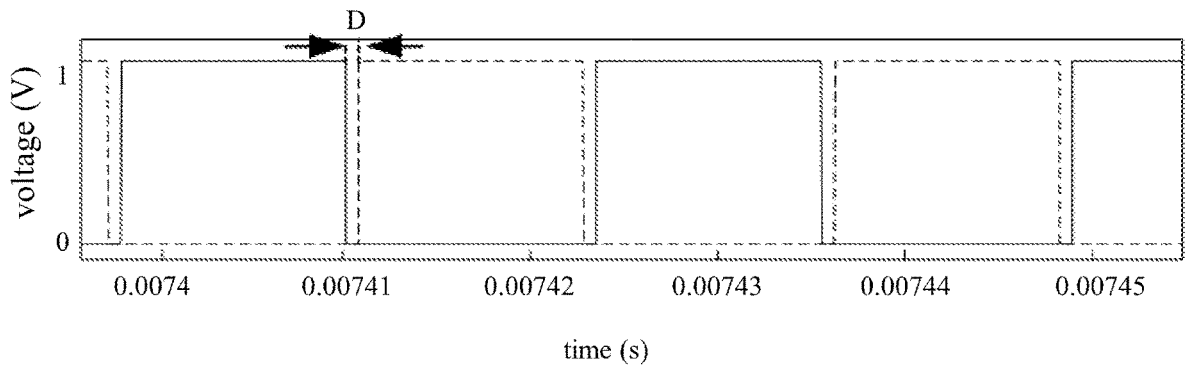
FIG. 2 is a driving waveform diagram of an embodiment of the first switching bridge arm of FIG. 1.
Figure 3:
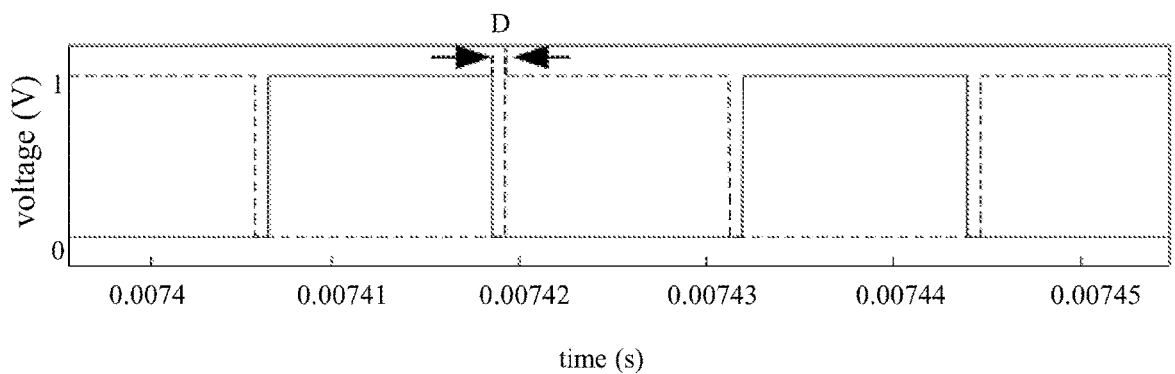
FIG. 3 is a driving waveform diagram of an embodiment of the second switching bridge arm of FIG. 1.
Figure 4:
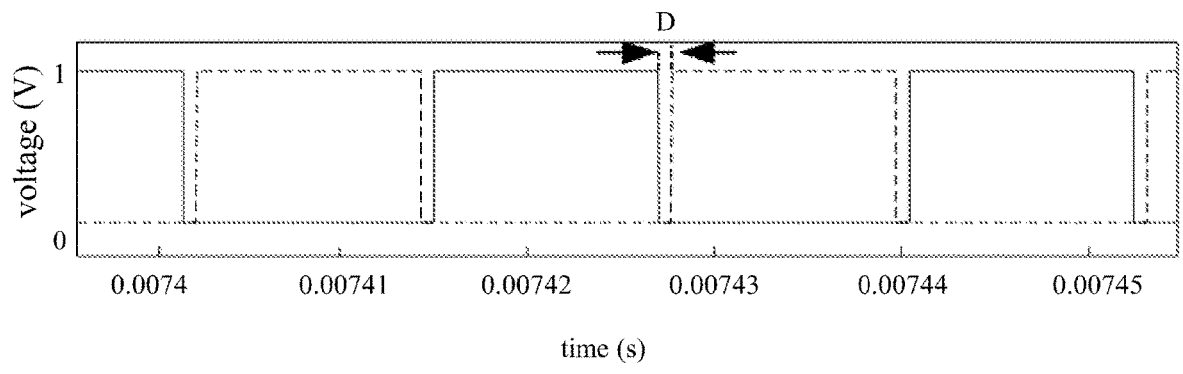
FIG. 4 is a driving waveform diagram of an embodiment of the third switching bridge arm of FIG. 1.

Please refer to FIGS. 1 to 4, wherein FIG. 2 is a driving waveform diagram of an embodiment of the first switching bridge arm of FIG. 1, FIG. 3 is a driving waveform diagram of an embodiment of the second switching bridge arm of FIG. 1, and FIG. 4 is a driving waveform diagram of an embodiment of the third switching bridge arm of FIG. 1. In FIG. 2 to FIG. 4, the horizontal axis represents a time, and a unit of the time is second (s); and the vertical axis represents the amount of change in the driving waveform without a unit. The solid line in FIG. 2 is the driving waveform of the first switch Q1, and the dashed line in FIG. 2 is the driving waveform of the first switch Q2. The solid line in FIG. 3 is the driving waveform of the second switch Q3, and the dashed line in FIG. 3 is the driving waveform of the second switch Q4. The solid line in FIG. 4 is the driving waveform of the third switch Q5, and the dashed line in FIG. 4 is the driving waveform of the third switch Q6.

The first switch Q1 and the first switch Q2 are complementarily turned on, and the necessary dead time D needs to be set between the driving waveforms of the first switch Q1 and the first switch Q2, to prevent shoot through the first switching bridge arm 112. The second switch Q3 and the second switch Q4 are complementarily turned on, and the necessary dead time D needs to be set between the driving waveforms of the second switch Q3 and the second switch Q4, to prevent shoot through the second switching bridge arm 114. The third switch Q5 and the third switch Q6 are complementarily turned on, and the necessary dead time D needs to be set between the driving waveforms of the third switch Q5 and the third switch Q6, to prevent shoot through the third switching bridge arm 116. In addition, the driving waveforms of the first switch Q1, the second switch Q3, and the third switch Q5 have the phase shift of 120 degrees (that is, the phase difference is 120 degrees).

Figure 5:
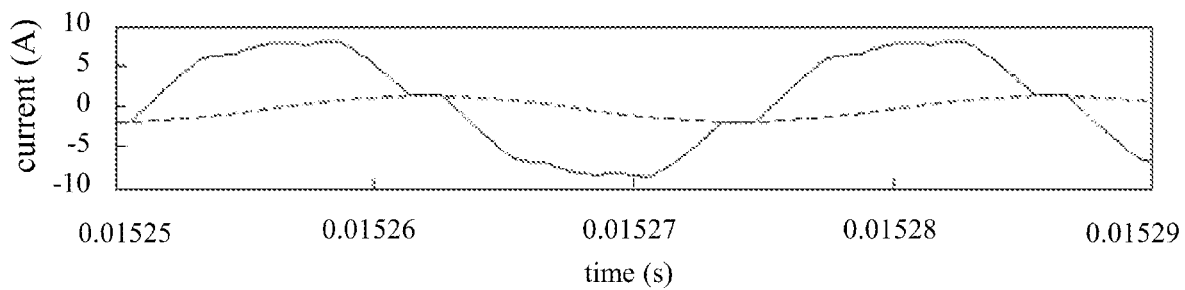
FIGS. 5 to 7 are waveform diagrams of an embodiment of the currents of the three resonant inductors and the current differences between any two of the three excitation inductors in FIG. 1, respectively.
Figure 6:
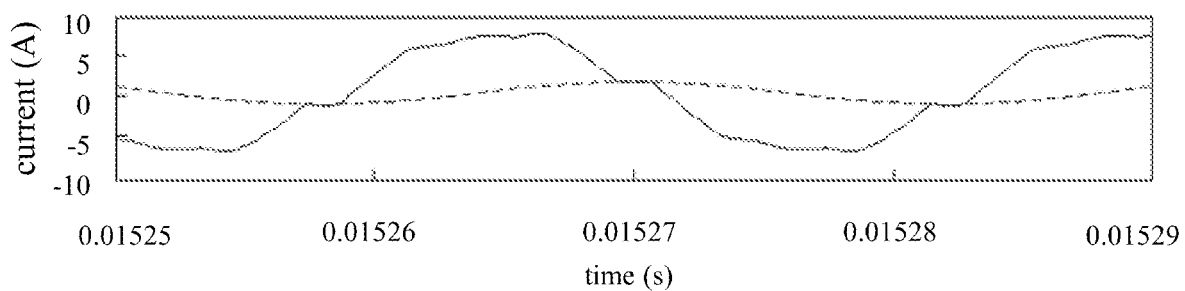
Figure 7:
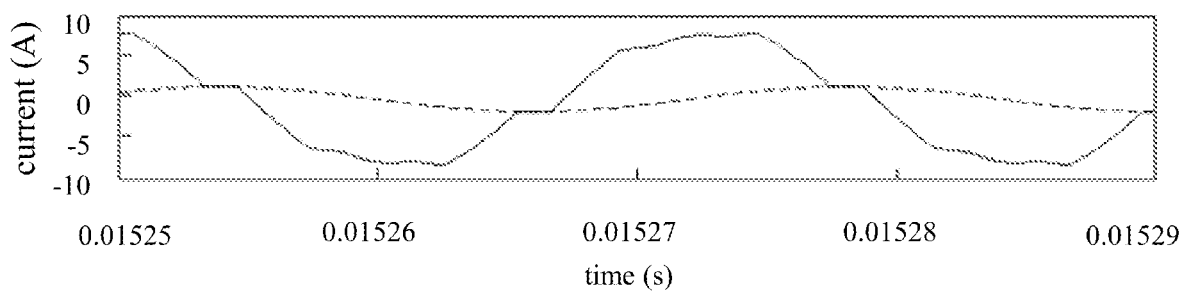
Figure 8:
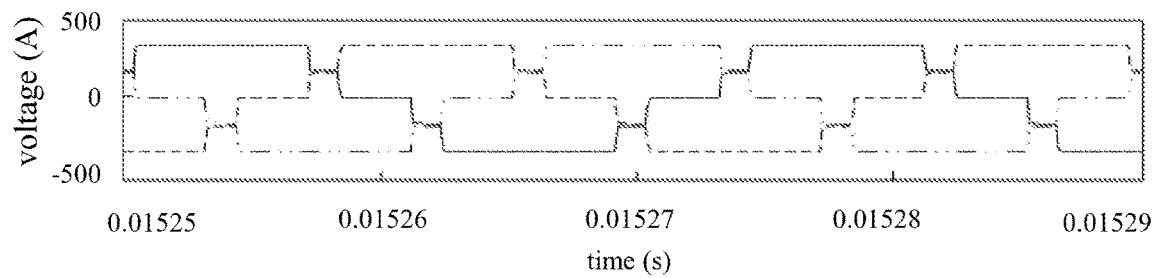
FIG. 8 is a waveform diagram of an embodiment of the voltage stresses of the three excitation inductors in FIG. 1.
Figure 9:
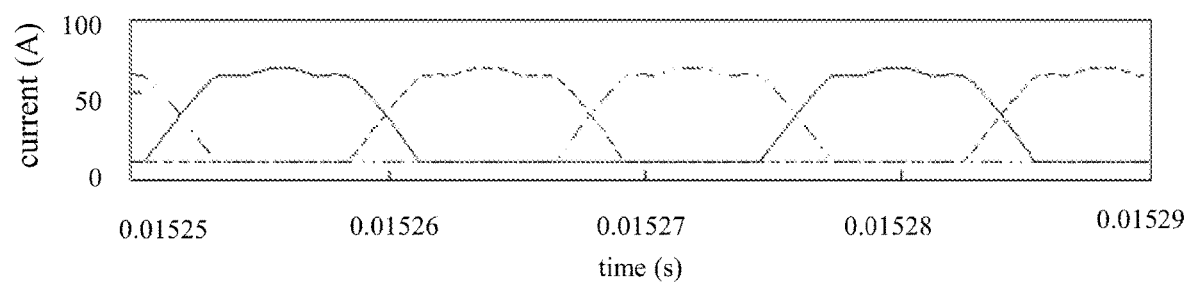
FIG. 9 is a waveform diagram of an embodiment of the current of the upper diode of each rectifier bridge arm in FIG. 1.
Figure 10:
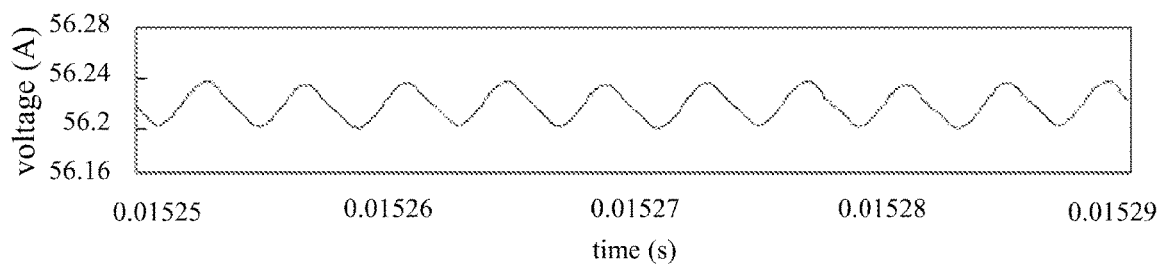
FIG. 10 is a waveform diagram of an embodiment of the output voltage of FIG. 1.

Please refer to FIG. 1 and FIGS. 5 to 10, wherein FIGS. 5 to 7 are waveform diagrams of an embodiment of the currents of the three resonant inductors and the current differences between any two of the three excitation inductors in FIG. 1, respectively; FIG. 8 is a waveform diagram of an embodiment of the voltage stresses of the three excitation inductors in FIG. 1; FIG. 9 is a waveform diagram of an embodiment of the current of the upper diode of each rectifier bridge arm in FIG. 1; and FIG. 10 is a waveform diagram of an embodiment of the output voltage of FIG. 1. The horizontal axis in FIGS. 5 to 10 represents a time, and a unit of the time is second (s); the vertical axis in FIGS. 5 to 7 and 9 represents a current, and a unit of the current is ampere (A); and the vertical axis in FIGS. 8 and 10 represents a voltage, and a unit of the voltage is volt (V).

The solid line in FIG. 5 is the current waveform of the first resonant inductor L1, and the dashed line in FIG. 5 is the waveform of the current difference between the first excitation inductor Lm1 and the third excitation inductor Lm3 (that is, the difference between the current value of the first excitation inductor Lm1 minus the current value of the third excitation inductor Lm3). The solid line in FIG. 6 is the current waveform of the second resonant inductor L2, and the dashed line in FIG. 6 is the waveform of the current difference between the second excitation inductor Lm2 and the first excitation inductor Lm1 (that is, the difference between the current value of the second excitation inductor Lm2 minus the current value of the first excitation inductor Lm1). The solid line in FIG. 7 is the current waveform of the third resonant inductor L3, the dashed line in FIG. 7 is the waveform of the current difference between the third excitation inductor Lm3 and the second excitation inductor Lm2 (that is, the difference between the current value of the third excitation inductor Lm3 minus the current value of the second excitation inductor Lm2).

The solid line in FIG. 8 is the voltage stress waveform of the first excitation inductor Lm1, the dashed line in FIG. 8 is the voltage stress waveform of the second excitation inductor Lm2, and the chain line in FIG. 8 is the voltage stress waveform of the third excitation inductor Lm3. The solid line in FIG. 9 Is the current waveform of the first diode D1, the dashed line in FIG. 9 is the current waveform of the second diode D3, and the chain line in FIG. 9 is the current waveform of the third diode D5.

It can be seen from FIG. 5 to FIG. 10 that the working principle of the resonant converter for each phase in the three-phase interleaved resonant converter 100 is similar to that of the existing single-phase resonant converter. When the three-phase resonant circuit 130 resonates, the three-phase interleaved resonant converter 100 can implement soft switching due to the current or voltage periodically crossing zero points, so as to reduce the switching loss.

Figure 11:
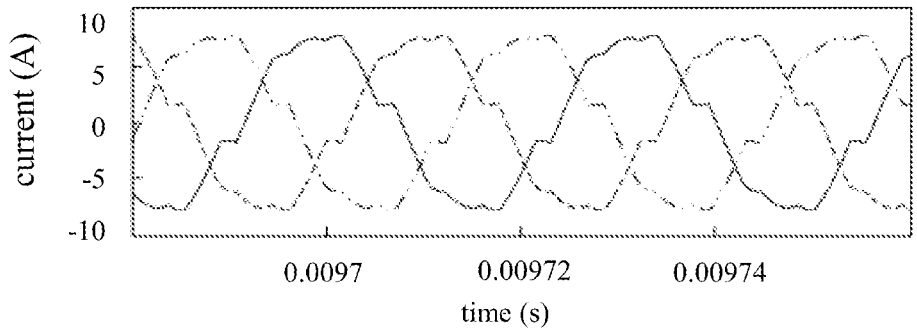
FIG. 11 is a waveform diagram of an embodiment of the currents of the three resonant inductors in FIG. 1.
Figure 12:
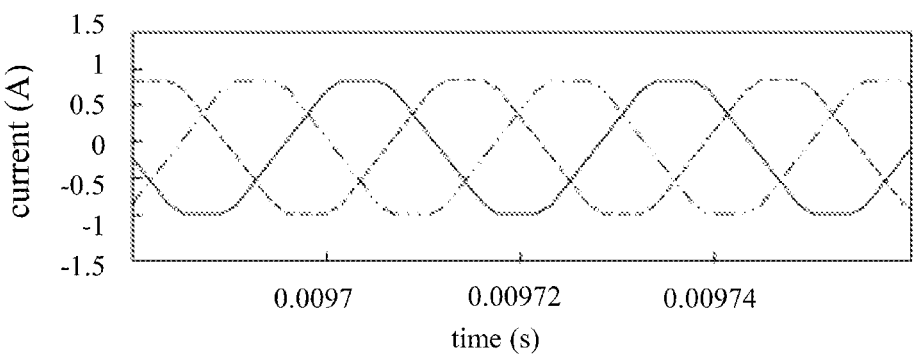
FIG. 12 is a waveform diagram of an embodiment of the currents of the three excitation inductors in FIG. 1.
Figure 13:
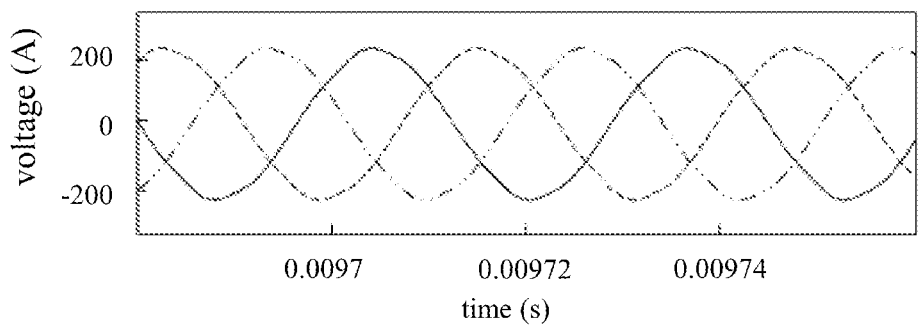
FIG. 13 is a waveform diagram of an embodiment of the voltage stresses of the three resonant capacitors in FIG. 1.

Please refer to FIG. 1 and FIG. 11 to FIG. 13, wherein FIG. 11 is a waveform diagram of an embodiment of the currents of the three resonant inductors in FIG. 1, FIG. 12 is a waveform diagram of an embodiment of the currents of the three excitation inductors in FIG. 1, and FIG. 13 is a waveform diagram of an embodiment of the voltage stresses of the three resonant capacitors in FIG. 1. The horizontal axis in FIG. 11 to FIG. 13 represents a time, and a unit of the time is second (s); the vertical axis in FIG. 11 and FIG. 12 represents a current, and a unit of the current is ampere (A); and the vertical axis in FIG. 13 represents a voltage, and a unit of the voltage is volt (V). The solid line in FIG. 11 is the current waveform of the first resonant inductor L1, the dashed line in FIG. 11 is the current waveform of the second resonant inductor L2, and the chain line in FIG. 11 is the current waveform of the third resonant inductor L3. The solid line in FIG. 12 is the current waveform of the first excitation inductor Lm1, the dashed line in FIG. 12 is the current waveform of the second excitation inductor Lm2, and the chain line in FIG. 12 is the current waveform of the third excitation inductor Lm3. The solid line in FIG. 13 is the voltage stress waveform of the first resonant capacitor C1, the dashed line in FIG. 13 is the voltage stress waveform of the second resonant capacitor C2, and the chain line in FIG. 13 is the voltage stress waveform of the third resonant capacitor C3.

It can be seen from FIG. 11 to FIG. 13 that the resonant currents of the first resonant inductor L1, the second resonant inductor L2, and the third resonant inductor L3 are equal, the currents of the first excitation inductor Lm1, the second excitation inductor Lm2, and the third excitation inductor Lm3 are equal, and the voltage stresses of the first resonant capacitor C1, the second resonant capacitor C2, and the third resonant capacitor C3 are equal. Therefore, the three-phase interleaved resonant converter 100 has the ability of natural current sharing.

Figure 14:
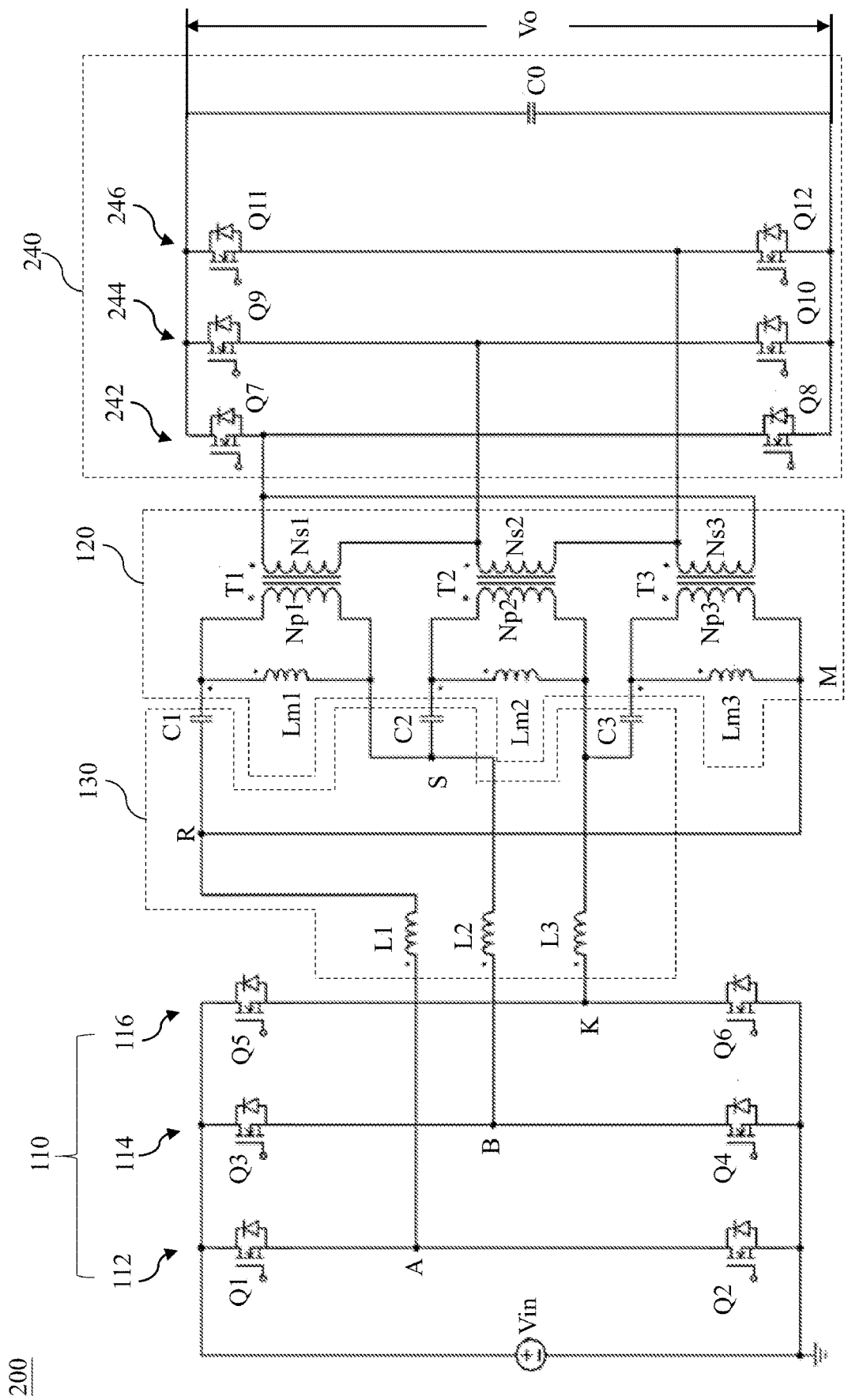
FIG. 14 is a circuit topology diagram of a three-phase interleaved resonant converter according to another embodiment of the present disclosure.

Please refer to FIG. 14, which is a circuit topology diagram of a three-phase interleaved resonant converter according to another embodiment of the present disclosure. As shown in FIG. 14, the difference between the three-phase interleaved resonant converter 200 and the three-phase interleaved resonant converter 100 of FIG. 1 is that the first rectifier bridge arm 242 comprises a fourth switch Q7 and a fourth switch Q8 connected in series, the second rectifier bridge arm 244 comprises a fifth switch Q9 and a fifth switch Q10 connected in series, and the third rectifier bridge arm 246 comprises a sixth switch Q11 and a sixth switch Q12 connected in series (that is, each of the three rectifier bridge arms of the three-phase rectifier filter circuit 240 comprises two switches connected in series).

In one embodiment, the fourth switch Q7, the fourth switch Q8, the fifth switch Q9, the fifth switch Q10, the sixth switch Q11, and the sixth switch Q12 may be IGBTs, SiC transistors, MOSFETs or GaN transistors.

In one embodiment, two ends of each of the fourth switch Q7, the fourth switch Q8, the fifth switch Q9, the fifth switch Q10, the sixth switch Q11, and the sixth switch Q12 are connected with a parallel reverse diode respectively.

It should be noted that the fourth switch Q7, the fourth switch Q8, the fifth switch Q9, the fifth switch Q10, the sixth switch Q11, and the sixth switch Q12 are switches with the same specification.

The power circuit provided by the embodiment of the present disclosure may comprise the three-phase interleaved resonant converter 100 or the three-phase interleaved resonant converter 200. Other components of the power circuit, such as a power supply and a housing, are not improved compared to the prior art, so there is no need to be repeated herein.

In summary, through the circuit topology design in which the first output node, the second output node and the third output node are respectively connected in series with the three resonant inductors, and then connected to the triangular configuration formed by the alternate connection of the three resonant capacitors with the primary windings of the three transformers, the three-phase interleaved resonant converter has a small number of components and has the ability of natural current sharing during operation, and no additional current sharing control means is required. In addition, since the primary windings of the three transformers and the three resonant capacitors are alternately connected to form the triangle configuration, the volume (or capacitance) of each resonant capacitor can be reduced by two-thirds and the power density can be improved. Moreover, since the primary windings of the three transformers and the three resonant capacitors are alternately connected to form the triangle configuration, and in each transformer, the excitation inductor is connected in parallel with the primary winding, the inductance of each excitation inductor is increased, and the excitation current and the magnetic core loss are reduced, thereby improving the efficiency of the three-phase interleaved resonant converter.

It is to be understood that the term "comprises", "comprising", or any other variants thereof, is intended to encompass a non-exclusive inclusion, such that a process, method, article, or device of a series of elements not only comprise those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A three-phase interleaved resonant converter, comprising:
  a three-phase inversion circuit connected to an input voltage and comprising a first output node, a second output node, and a third output node;
  a three-phase transformer comprising three transformers;
  a three-phase resonant circuit comprising a first resonant inductor, a second resonant inductor, a third resonant inductor, a first resonant capacitor, a second resonant capacitor and a third resonant capacitor, wherein a first end of the first resonant inductor is directly connected to the first output node, a second end of the first resonant inductor is directly connected to a first end of the first resonant capacitor, a first end of the second resonant inductor is directly connected to the second output node, a second end of the second resonant inductor is directly connected to a first end of the second resonant capacitor, a first end of the third resonant inductor is directly connected to the third output node, a second end of the third resonant inductor is directly connected to a first end of the third resonant capacitor, a second end of the first resonant capacitor is connected to the first end of the second resonant capacitor and the three-phase transformer, a second end of the second resonant capacitor is connected to the first end of the third resonant capacitor and the three-phase transformer and a second end of the third resonant capacitor is connected to the first end of the first resonant capacitor and the three-phase transformer; and
  a three-phase rectifier filter circuit connected with secondary windings of the three transformers to rectify and filter secondary currents output by the secondary windings of the three transformers respectively, and generate an output voltage accordingly,
  wherein the three-phase inversion circuit comprises a first switching bridge arm, a second switching bridge arm, and a third switching bridge arm connected in parallel, a midpoint of the first switching bridge arm is the first output node, a midpoint of the second switching bridge arm is the second output node, a midpoint of the third switching bridge arm is the third output node;
wherein the first switching bridge arm only comprises two first switches connected in series, the second switching bridge arm only comprises two second switches connected in series, and the third switching bridge arm only comprises two third switches connected in series,
wherein a phase difference between driving pulses of the first switching bridge arm and driving pulses of the second switching bridge arm is 120 degrees, a phase difference between the driving pulses of the second switching bridge arm and driving pulses of the third switching bridge arm is 120 degrees, and a phase difference between the driving pulses of the third switching bridge arm and the driving pulses of the first switching bridge arm is 120 degrees,
wherein the two first switches of the first switching bridge arm connected in series are with a switching timing difference of 180 degrees, the two second switches of the second switching bridge arm connected in series are with a switching timing difference of 180 degrees, and the two third switches of the third switching bridge arm connected in series are with a switching timing difference of 180 degrees, and
wherein two ends of the two first switches, the two second switches, and the two third switches are connected with a parallel reverse diode respectively.

2. The three-phase interleaved resonant converter according to claim 1, wherein, in each of the three transformers, an excitation inductor is connected in parallel with a primary winding of each of the three transformers.

3. The three-phase interleaved resonant converter according to claim 2, wherein the excitation inductor of each of the three transformers, the first resonant capacitor, the second resonant capacitor and the third resonant capacitor are connected in series.

4. The three-phase interleaved resonant converter according to claim 1, wherein the three-phase rectifier filter circuit comprises three rectifier bridge arms connected in parallel, and midpoints of the three rectifier bridge arms are connected to a triangular configuration formed by the secondary windings of the three transformers connected to each other, respectively.

5. The three-phase interleaved resonant converter according to claim 4, wherein each of the three rectifier bridge arms comprises two switches or two diodes connected in series.

6. The three-phase interleaved resonant converter according to claim 4, wherein the three-phase rectifier filter circuit further comprises a filter capacitor connected in parallel with the three rectifier bridge arms, and the filter capacitor is configured to convert the secondary currents rectified by the three rectifier bridge arms to the output voltage that provides energy to an output load circuit.

7. The three-phase interleaved resonant converter according to claim 1, wherein the three transformers comprises a first transformer, a second transformer, and a third transformer; the first resonant capacitor, a primary winding of the first transformer, the second resonant capacitor, a primary winding of the second transformer, the third resonant capacitor, and a primary winding of the third transformer are connected in sequence to form the triangular configuration; two ends of the first resonant inductor are respectively connected to a connection node between the first resonant capacitor and the primary winding of the third transformer and the first output node; two ends of the second resonant inductor are respectively connected to a connection node between the second resonant capacitor and the primary winding of the first transformer and the second output node; and two ends of the third resonant inductor are respectively connected to a connection node between the third resonant capacitor and the primary winding of the second transformer and the third output node.

8. A power circuit, comprising:
a three-phase interleaved resonant converter, comprising:
a three-phase inversion circuit connected to an input voltage and comprising a first output node, a second output node, and a third output node;
a three-phase transformer comprising three transformers;
a three-phase resonant circuit comprising a first resonant inductor, a second resonant inductor, a third resonant inductor, a first resonant capacitor, a second resonant capacitor and a third resonant capacitor, wherein a first end of the first resonant inductor is directly connected to the first output node, a second end of the first resonant inductor is directly connected to a first end of the first resonant capacitor, a first end of the second resonant inductor is directly connected to the second output node, a second end of the second resonant inductor is directly connected to a first end of the second resonant capacitor, a first end of the third resonant inductor is directly connected to the third output node, a second end of the third resonant inductor is directly connected to a first end of the third resonant capacitor, a second end of the first resonant capacitor is connected to the first end of the second resonant capacitor and the three-phase transformer, a second end of the second resonant capacitor is connected to the first end of the third resonant capacitor and the three-phase transformer and a second end of the third resonant capacitor is connected to the first end of the first resonant capacitor and the three-phase transformer; and
a three-phase rectifier filter circuit connected with secondary windings of the three transformers to rectify and filter secondary currents output by the secondary windings of the three transformers respectively, and generate an output voltage accordingly,
wherein the three-phase inversion circuit comprises a first switching bridge arm, a second switching bridge arm, and a third switching bridge arm connected in parallel, a midpoint of the first switching bridge arm is the first output node, a midpoint of the second switching bridge arm is the second output node, a midpoint of the third switching bridge arm is the third output node;
wherein the first switching bridge arm only comprises two first switches connected in series, the second switching bridge arm only comprises two second switches connected in series, and the third switching bridge arm only comprises two third switches connected in series,
wherein a phase difference between driving pulses of the first switching bridge arm and driving pulses of the second switching bridge arm is 120 degrees, a phase difference between the driving pulses of the second switching bridge arm and driving pulses of the third switching bridge arm is 120 degrees, and a phase difference between the driving pulses of the third switching bridge arm and the driving pulses of the first switching bridge arm is 120 degrees,
wherein the two first switches of the first switching bridge arm connected in series are with a switching timing difference of 180 degrees, the two second switches of the second switching bridge arm connected in series are with a switching timing difference of 180 degrees, and the two third switches of the third switching bridge arm connected in series are with a switching timing difference of 180 degrees, and wherein two ends of the two first switches, the two second switches, and the two third switches are connected with a parallel reverse diode respectively.

9. The power circuit according to claim 8, wherein, in each of the three transformers, an excitation inductor is connected in parallel with a primary winding of each of the three transformers.

10. The power circuit according to claim 9, wherein the excitation inductor of each of the three transformers, the first resonant capacitor, the second resonant capacitor and the third resonant capacitor are connected in series.

11. The power circuit according to claim 8, wherein the three-phase rectifier filter circuit comprises three rectifier bridge arms connected in parallel, and midpoints of the three rectifier bridge arms are connected to a triangular configuration formed by the secondary windings of the three transformers connected to each other, respectively.

12. The power circuit according to claim 11, wherein each of the three rectifier bridge arms comprises two switches or two diodes connected in series.

13. The power circuit according to claim 11, wherein the three-phase rectifier filter circuit further comprises a filter capacitor connected in parallel with the three rectifier bridge arms, and the filter capacitor is configured to convert the secondary currents rectified by the three rectifier bridge arms to the output voltage that provides energy to an output load circuit.

14. The power circuit according to claim 8, wherein the three transformers comprises a first transformer, a second transformer, and a third transformer; the first resonant capacitor, a primary winding of the first transformer, the second resonant capacitor, a primary winding of the second transformer, the third resonant capacitor, and a primary winding of the third transformer are connected in sequence to form the triangular configuration; two ends of the first resonant inductor are respectively connected to a connection node between the first resonant capacitor and the primary winding of the third transformer and the first output node; two ends of the second resonant inductor are respectively connected to a connection node between the second resonant capacitor and the primary winding of the first transformer and the second output node; and two ends of the third resonant inductor are respectively connected to a connection node between the third resonant capacitor and the primary winding of the second transformer and the third output node.

* * * * *